United States Patent
Dietrich et al.

(10) Patent No.: US 10,288,360 B2
(45) Date of Patent: May 14, 2019

(54) METHOD FOR PRODUCING A PLATE HEAT EXCHANGER WITH MULTIPLE HEAT EXCHANGER BLOCKS CONNECTED BY SOLDER-COATED SUPPORTS

(71) Applicant: LINDE AKTIENGESELLSCHAFT, Munich (DE)

(72) Inventors: Jörg Dietrich, Erding (DE); Reinhold Hölzl, Geretsried (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 496 days.

(21) Appl. No.: 14/914,662

(22) PCT Filed: Aug. 14, 2014

(86) PCT No.: PCT/EP2014/002243
§ 371 (c)(1),
(2) Date: Feb. 26, 2016

(87) PCT Pub. No.: WO2015/028125
PCT Pub. Date: Mar. 5, 2015

(65) Prior Publication Data
US 2016/0209129 A1    Jul. 21, 2016

(30) Foreign Application Priority Data
Aug. 29, 2013   (EP) ..................................... 13004273

(51) Int. Cl.
*B23K 1/00*          (2006.01)
*F25J 5/00*          (2006.01)
(Continued)

(52) U.S. Cl.
CPC .............. *F28F 3/10* (2013.01); *B23K 1/0012* (2013.01); *B23P 15/26* (2013.01); *F25J 5/002* (2013.01);
(Continued)

(58) Field of Classification Search
CPC ........... F28D 9/00; B23K 1/00; B23K 1/0012; B23K 2101/14; F25J 5/00; F28F 2275/04; F28F 2275/045; B23P 15/26; Y10T 29/49366; Y10T 29/49368; Y10T 29/49393
See application file for complete search history.

(56) References Cited

U.S. PATENT DOCUMENTS 3,372,453 A * 3/1968 Butt .......................... F28D 9/00
                                                              165/166
4,297,775 A * 11/1981 Butt ....................... B21D 53/04
                                                             29/890.039
(Continued)

FOREIGN PATENT DOCUMENTS

EP         0952419 A1    10/1999
FR         2793548 A1    11/2000

*Primary Examiner* — Jason L Vaughan
(74) *Attorney, Agent, or Firm* — Millen White Zelano & Branigan, PC (57) ABSTRACT

A method for producing a plate heat exchanger with at least two heat exchanger blocks which are produced separately from one another in a soldering furnace Each heat exchanger block has multiple separating sheets arranged parallel to one another and which form a plurality of beat exchanger passages for fluids involved in a heat exchange process. At least one support provided with solder is heated in order to melt the solder, the support is arranged between opposing outer surfaces of the heat exchanger blocks to be connected which are placed one on top of the other or adjacently, the support(s) thus being fixed between the opposing outer surfaces. After the solder is hardened, a bonded and heat-conductive connection is produced between the heat exchanger blocks. Sheets or wire arrangement can be used as the supports.

16 Claims, 3 Drawing Sheets

(51) Int. Cl.
*F28D 9/00* (2006.01)
*F28F 3/08* (2006.01)
*F28F 3/10* (2006.01)
*B23P 15/26* (2006.01)
*F28F 9/007* (2006.01)
*B23K 101/14* (2006.01)

(52) U.S. Cl.
CPC .............. *F28D 9/0068* (2013.01); *F28F 3/08* (2013.01); *F28F 9/0075* (2013.01); *B23K 2101/14* (2018.08); *F25J 2290/50* (2013.01); *F28F 2225/00* (2013.01); *Y10T 29/49366* (2015.01); *Y10T 29/49368* (2015.01); *Y10T 29/49393* (2015.01)

(56) References Cited

U.S. PATENT DOCUMENTS

| | | | | |
|---|---|---|---|---|
| 2004/0251008 | A1* | 12/2004 | O'Neill | F25J 3/04412 165/166 |
| 2007/0289726 | A1* | 12/2007 | Jibb | F25J 3/04284 165/165 |
| 2008/0041571 | A1* | 2/2008 | Minami | B23K 1/0012 165/151 |
| 2009/0320291 | A1* | 12/2009 | O'Neill | B23K 1/0012 29/890.046 |
| 2012/0152507 | A1 | 6/2012 | Godry | |
| 2013/0255924 | A1* | 10/2013 | Dietrich | F28D 9/0068 165/167 |
| 2013/0299963 | A1* | 11/2013 | Otaki | H01L 23/36 257/712 |

* cited by examiner

METHOD FOR PRODUCING A PLATE HEAT EXCHANGER WITH MULTIPLE HEAT EXCHANGER BLOCKS CONNECTED BY SOLDER-COATED SUPPORTS

The invention relates to a method for producing a plate heat exchanger with at least two heat exchanger blocks, each heat exchanger block having multiple parting sheets, which are arranged parallel to one another and form a multiplicity of heat exchange passages for fluids involved in the heat exchange. Moreover, the application also relates to just such a plate heat exchanger in which the heat exchanger blocks have at least one common header for distributing a heat-exchanging fluid to the two heat exchanger blocks or for discharging a heat-exchanging fluid from the two heat exchanger blocks.

Brazed aluminum plate heat exchangers are used in numerous installations at a wide range of different pressures and temperatures. They are used for example for the separation of air, the liquefaction of natural gas or in ethylene production plants.

Figure 1:
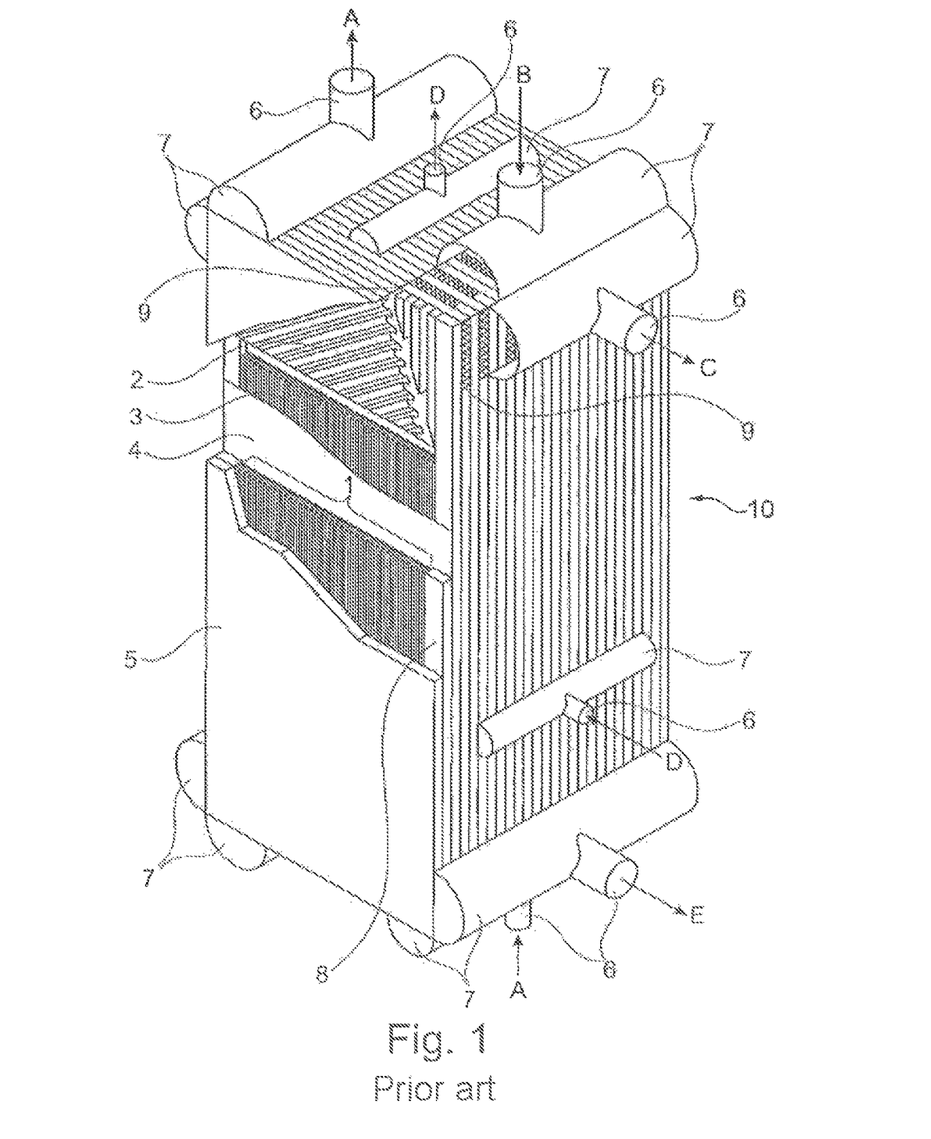
FIG. 1 shows a prior art plate heat exchanger taken from "The standards of the brazed aluminum plate-fin heat exchanger manufacturers' associaton" ALPEMA, Third Edition, 2010, and described above.

Such a plate heat exchanger is shown and described for example on page 5 in "The standards of the brazed aluminium plate-fin heat exchanger manufacturers' association" ALPEMA, Third Edition, 2010. An illustration taken from this is shown in FIG. 1 as prior art and is described below.

The plate heat exchanger shown there comprises multiple parting sheets 4, which are arranged parallel to one another and form a multiplicity of heat exchange passages 1 for the media to be brought together in heat exchange. The heat exchange passages 1 are closed off from the outside by sheet-metal strips 8, which are attached flush to the periphery of the parting sheets 4 and are also referred to hereinafter as side bars 8. Arranged within the heat exchange passages 1 are corrugated sheets 3, known as fins 3. The parting sheets 4, fins 3 and side bars 8 are fixedly connected to one another, and consequently form a compact heat exchanger block 10. The entire heat exchanger block 10 is outwardly delimited by cover sheets 5.

For supplying and discharging the heat-exchanging media, semi-cylindrical collectors 7 with connector stubs 6 that serve for the connection of supplying and discharging pipelines, are attached by way of inlet and outlet ports 9 of the heat exchange passages 1. The collectors 7 are also referred to hereinafter as headers 7. The inlet and outlet ports 9 of the heat exchange passages 1 are formed by fins known as distributor fins 2, which provide a uniform distribution of the media within the individual heat exchange passages 1. The media flow into the channels formed by the fins 3 and the parting sheets 4 through the heat exchange passages 1.

The fins 3 are brazed at their contact points with the parting sheets 4, whereby an intensive heat-conducting contact between the fins 3 and the parting sheets 4 is established. This has the effect of improving the heat exchange between the various media alternately in adjacent heat exchange passages 1.

Such plate heat exchangers are preferably formed from aluminum, the components being connected to one another by brazing. However, high-grade steel may also be used as the material. The fins, parting sheets, distributor fins, cover sheets and side bars provided with solder are stacked one on top of the other and then brazed in a furnace to form a heat exchanger block. The headers with connector stubs are then welded onto the heat exchanger block.

Using the production method just described, the maximum size of such a heat exchanger block is dictated by the size and geometry of the brazing furnace. However, processes often demand a larger heat-exchanging surface area, and consequently larger heat exchanger blocks, than can be produced in such a furnace. In order to meet these requirements, it is proposed under 1.2.3 on page 6 of the aforementioned publication to connect two or more heat exchanger blocks to one another by welding, and thereby obtain a combined heat exchanger block with an increased stack height.

In order to produce a plate heat exchanger with multiple heat exchanger blocks, first two or more heat exchanger blocks are produced separately from one another from parting sheets, fins and distributor fins as described above in a brazing furnace.

Therefore, with the brazing furnace sizes that are customary today, the heat exchanger blocks can have a maximum length of approximately 8.2 m, a maximum width of approximately 1.5 m and a maximum height of approximately 3.0 m. They are still without headers. Bars are welded onto the cover sheet of a first heat exchanger block along the edges of the cover sheet and finish flush with the edges of the cover sheet. These bars, often also referred to as side bars, form a kind of frame on the cover sheet. A second heat exchanger block, which is to be connected to the first heat exchanger block, is placed with its cover sheet onto the bars of the first heat exchanger block and welded to them. The arrangement comprising the two connected heat exchanger blocks has a greater stack height than the individual heat exchanger blocks, which consequently exceeds the size and geometry of the brazing furnace. In this way, any number of heat exchanger blocks can be connected to one another to form a heat exchanger block arrangement of any size. Then, the heat exchanger block arrangement created is provided with headers and connector stubs, in order to obtain a large plate heat exchanger, which comprises multiple heat exchanger blocks connected to one another.

Between the cover sheets of two adjacent heat exchanger blocks of such a plate heat exchanger there is a cavity surrounded by the side bars, which is filled with air. This cavity is not flowed through by one of the media involved in the heat exchange. It is not pressurized.

In the case of such plate heat exchangers comprising multiple heat exchanger blocks, in a wide variety of applications high stress concentrations occur in the transitional region of the heat exchanger blocks.

The present invention is based on the object of providing a method for producing a plate heat exchanger comprising multiple heat exchanger blocks and such a plate heat exchanger that has the greatest possible mechanical strength but in which stresses in the transitional region of the heat exchanger block are reduced.

The set object is achieved by a method with the features described herein and by a plate heat exchanger as described herein.

Accordingly, a method for producing a plate heat exchanger with at least two heat exchanger blocks that are produced separately from one another in a brazing furnace is provided, each heat exchanger block having multiple parting sheets, which are arranged parallel to one another and form a multiplicity of heat exchange passages for fluids involved in the heat exchange. According to the invention, after separately producing the heat exchanger blocks in the brazing furnace, the following steps are taken in the method: at least one support provided with solder is heated to melt the solder, the support is arranged between opposing outer surfaces of heat exchanger blocks to be connected, and the heat exchanger blocks to be connected are placed one on top of the other or one against the other in such a way that the at least one support is secured between opposing outer surfaces of the heat exchanger blocks to be connected, i.e. the support is fixed between the two outer surfaces of the heat exchanger blocks. Once the solder has hardened, the outer surfaces of the heat exchanger blocks are connected to another in a material-bonded and frictional manner by way of the at least one support and the hardened solder. The support may already be arranged between the outer surfaces to be connected, at a distance from them, before heating, in order to be able to fix the support between the outer surfaces without a great delay or gap after heating. The heated support may however also only be placed between the outer surfaces shortly before the heat exchanger blocks are placed one against the other or are placed one on top of the other. There is also the possibility of first placing the heated support against the outer surface of one heat exchanger block before the further heat exchanger block is placed against or on the support.

The present invention also comprises a plate heat exchanger with at least two heat exchanger blocks, each heat exchanger block having multiple parting sheets, which are arranged parallel to one another and form a multiplicity of heat exchange passages for fluids involved in the heat exchange, and the heat exchanger blocks being outwardly delimited by cover sheets and having at least one common header for distributing a heat-exchanging fluid to the two heat exchanger blocks or for discharging a heat-exchanging fluid from the two heat exchanger blocks. According to the invention, the heat exchanger blocks are respectively connected at opposing cover sheets by at least one flat support, which is connected to the cover sheets of the heat exchanger blocks by solder. The cover sheets generally have a greater material thickness than the parting sheets located within the heat exchanger blocks.

The connection according to the invention of the outer surfaces or the cover sheets of the heat exchanger blocks by way of the at least one support provided with solder ensures a connection over a greater surface area than is the case in the prior art. The outer surfaces of the heat exchanger blocks, which are generally formed by the cover sheets of the heat exchanger blocks, are connected to one another in a heat-conducting manner by the at least one support attached by solder. The heat conduction makes it possible to equalize temperature differences between the adjacent heat exchanger blocks, whereby temperature-induced stresses between the heat exchanger blocks in the connecting region of the heat exchanger blocks are reduced. The support/solder connection between the heat exchanger blocks has the effect of creating a frictional connection right into the center of the opposing outer surfaces, whereby the mechanical strength of the connection between the heat exchanger blocks is improved. As a result, the operational reliability and fail safety or the service life of the plate heat exchanger is greatly increased.

In the case of a plate heat exchanger comprising multiple heat exchanger blocks according to the prior art, on the other hand, the opposing outer surfaces or cover sheets of two adjacent heat exchanger blocks are only connected to one another at the respective edges of the outer surfaces by way of the bars that are flush with the periphery. Consequently, the plate heat exchanger according to the prior art has no connections in the center of the opposing outer surfaces. Correspondingly, the thermal contact between two heat exchanger blocks on the basis of the air-filled cavity is much worse than the thermal contact between the heat exchanger passages within a heat exchanger block. As a result, temperature-induced clamping stresses occur in isolated locations of the outer peripheral weld. In a wide variety of applications, this may lead to high thermal stresses within the plate heat exchanger at the transition of the heat exchanger blocks. With the support/solder connection according to the invention, this is prevented.

The at least one support preferably consists of metal, for example in the form of metal sheet or an arrangement of metal wires. The preferred thickness of the at least one support lies between approximately 0.4 mm and approximately 50 mm.

With particular preference, the at least one support has an area extent that corresponds at least to the outer surfaces to be connected of the heat exchanger blocks. It should be noted in this respect that the outer surfaces to be connected of the heat exchanger blocks generally have the same lengths and widths, and consequently also contain approximately the same surface areas. A full-area support allows the heat exchanger blocks to be connected to one another over their entire outer surfaces, whereby a very stable mechanical connection of the two surfaces to one another is created. This avoids notch effects, as previously occurred with only local connections of the outer surfaces provided by outer welds just running around edges of the heat exchanger blocks.

Apart from a full-area form of the supports, there is also the possibility of forming the support in such a way that it only covers a partial area of the outer surfaces of the heat exchanger blocks. If this is the case, with preference multiple partial-area supports, for example in the form of strips, are arranged next to one another. The strips may be spaced apart from one another. With preference, however, they are arranged next to one another in an approximately abutting manner. In a preferred embodiment, the support or supports accordingly fill(s) the opposing outer surfaces of the heat exchanger blocks more or less completely. There is consequently heat-conducting contact over the entire outer surfaces of the heat exchanger blocks, whereby a temperature equalization between the heat exchanger blocks can optimally take place. However, as described above, there is also the possibility of providing only partial regions of the intermediate space with the solder-coated supports. However, the solder-coated supports preferably reach into the center of the opposing outer surfaces of the heat exchanger blocks.

To even out unevennesses of the outer surfaces of the heat exchanger blocks, multiple supports, in particular metal sheets, preferably two to four, may be arranged parallel to one another, i.e. in a stack, between the outer surfaces of the heat exchanger blocks to be connected, the supports respectively having more or less surface areas that correspond to those of the outer surfaces of the heat exchanger blocks to be connected. The solder located on the supports may form different solder layer thicknesses during the connecting of the heat exchanger blocks, and thereby even out unevennesses that are present within the outer surfaces and in the gap between the outer surfaces to be connected.

The at least one support may be provided with solder on one side or on both sides that are facing the outer surfaces of the heat exchanger blocks. In the case of metal sheets, they are preferably provided with a continuous solder layer from both sides. If an arrangement of metal wires is used as the support, the wires are preferably completely coated with solder. If, for example, multiple metal sheets are arranged in the form of a stack between the outer surfaces of the heat exchanger blocks, individual supports may also be provided with solder only on one side.

The at least one support is preferably coated with a solder layer, which is preferably applied to the support in such a way that it cannot lift off. The solder layer may be formed for example by cladding, spraying or dipping. Solder layer thicknesses of between approximately 0.7 mm and approximately 0.17 mm are preferred. Multiple layers of solder may also be applied one on top of the other by a process known as multiple solder cladding. This is particularly advantageous if unevennesses on the outer surfaces of the heat exchanger blocks to be connected are to be evened out. The connection of the support material and the solder material may however also be formed by an adhesive layer. It is also possible to place the solder layer, for example in the form of a film, loosely onto the support before the heating of the support. Solder-clad metal sheets conforming to European standard EN-AW 3003 or EN-AW 5083, with an AlSi10Mg solder cladding, are used with particular preference as supports.

The heat exchanger blocks of the plate heat exchanger are preferably connected to one another by way of a wire-grid/solder connection. A preferred embodiment of the method or the plate heat exchanger according to the invention envisages providing at least one first support, which has multiple first solder-coated wire rods arranged parallel to one another in a first plane, and at least one second support, which likewise has multiple second solder-coated wire rods arranged parallel to one another in a second plane, the first support and the second support being arranged in relation to one another in such a way that the first plane and the second plane are arranged parallel to one another and the first wire rods and the second wire rods are arranged at an angle to one another, the first and second wire rods preferably forming with one another an included angle of approximately 900. The wires preferably have a thickness in the range from approximately 0.2 mm to approximately 5 mm.

There are various possibilities for heating the support to melt the solder: the support or supports may be heated by applying an electrical voltage in the sense of resistance heating. As an alternative to this, heating of the support or supports may also be performed by an induction means, such as an induction coil. The operating principle of induction heating is that, for example, a working coil comprising one or more turns (inductor) is flowed through by an alternating current. This inductor builds up an alternating electromagnetic field around it. If the at least one support is introduced into this alternating electromagnetic field, then a voltage is induced in it and generates an alternating current. In accordance with Joule's law, heat is then generated as a result in the surface region of the support through which the current flows. The solder is then made to melt by the heat induced in the support, and possibly also heating of the solder itself.

As soon as the support has reached the melting temperature of the solder, further heat generation is preferably stopped immediately and, preferably directly thereafter, the heat exchanger blocks are placed one on top of the other or one against the other. The introduction of an excessive amount of heat into the connection between the heat exchanger blocks should be avoided, in order not to melt the solder that is used within the heat exchanger blocks or induce thermal stresses in the heat exchanger blocks. The support solder, with which the support or supports is/are provided, preferably has a lower melting point than the component solder, by which components within the heat exchanger blocks are connected. This avoids melting of the component solder by the heat introduced during the joining together of the heat exchanger blocks.

After heating of the support and melting of the solder, the heat exchanger blocks can be placed one on top of the other, in that one heat exchanger block is placed onto another heat exchanger block. The gravitational force of the upper heat exchanger block has the effect that the support is fixed by the solder between the outer surfaces.

Parts of the support or the supports that protrude laterally beyond the dimensions of the outer surfaces of the heat exchanger blocks connected to one another may be cut off after the heat exchanger blocks have been joined together. This is preferably followed by attaching headers and connector stubs to the heat exchanger blocks, also including at least one common header that is respectively connected to at least two heat exchanger blocks.

The plate heat exchanger according to the invention preferably has in the heat exchange passages of the heat exchanger blocks means for dividing the heat exchange passage into a multiplicity of channel. These are preferably corrugated sheets, which may have various forms that are known to a person skilled in the art. They serve the purpose of increasing the heat conduction between the heat exchange passages and distributing the fluids uniformly over the heat exchange passages. Moreover, they increase the mechanical strength of the heat exchanger block.

In the case of a plate heat exchanger according to the present invention, the mechanical and thermal connection between two adjacent heat exchanger blocks is much improved in comparison with the prior art. The entire plate heat exchanger, consisting of multiple heat exchanger blocks, is a much more rigid and mechanically stable formation than a plate heat exchanger according to the prior art. In addition, a plate heat exchanger according to the invention has a much better temperature equalization between two adjacent heat exchanger blocks. Plate heat exchangers that comprise two or more than two, preferably however two to five, heat exchanger blocks may be provided within the scope of the present invention. Since the mechanical strength of the connection between the individual heat exchanger blocks is increased in comparison with the prior art, plate heat exchangers that consist of a greater number of blocks than was previously customary and appeared to be feasible can also be realized.

The plate heat exchanger according to the invention may be used particularly advantageously for methods that require a particularly intensive thermal contact between the outer surfaces of adjacent heat exchanger blocks. This is the case for example with steep temperature gradients, great changes in the temperature gradient or unequal distributions of the fluids participating in the heat exchange (maldistribution). Such states may often occur in the case of certain evaporation processes of two-phase mixtures or substances by themselves, in the case of an asymmetrical passage arrangement, non-specified operating states, shut-down or start-up procedures.

BRIEF DESCRIPTION OF THE DRAWINGS

The invention is to be explained in more detail below on the basis of the FIG. 1 and the exemplary embodiment of the invention that is represented in FIGS. 2 to 4, in which.

Figure 2:
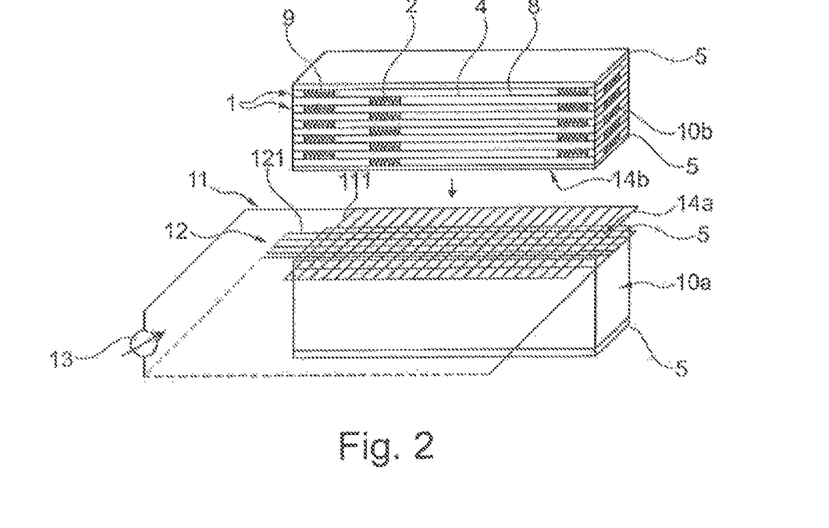
FIG. 2 shows a perspective view of two heat exchanger blocks that are connected to one another by way of a metal wire grid.

FIG. 2 shows two heat exchanger blocks 10a and 10b. The structure of the heat exchanger block 10a is shown in more detail than that of block 10b. However, they both have the same structure. In the same way as the block 10 that is represented in FIG. 1, the heat exchanger blocks 10a and 10b have a multiplicity of planar sheets 4, also referred to hereinafter as parting sheets 4, which are arranged in a stack parallel to and at a distance from one another. Arranged on the parting sheets 4, respectively flush at their outer edges, are sheet-metal strips 8, which fix the distance between the parting sheets 4 and are also referred to hereinafter as side bars 8. The structure has the effect of forming between the parting sheets 4 a multiplicity of heat exchange passages 1, which are available for an indirect heat exchange of two or more fluids. The heat exchange passages 1 are closed off from the outside by the side bars 8.

Arranged within the heat exchange passages 1 are corrugated sheets 3, known as fins 3. These cannot be seen in FIG. 3 because they are located within the heat exchanger blocks 10a and 10b. Reference is therefore made to FIG. 1, which shows fins 3 in the side elevation of the heat exchanger block 10. At inlet and outlet ports 9 of the heat exchange passages 1 there are fins known as distributor fins 2, which provide a uniform distribution of the fluids over the flow cross sections of the individual heat exchange passages 1. The two heat exchanger blocks 10a and 10b are respectively outwardly delimited—in the view represented—in the upward and downward directions by cover sheets 5. The cover sheets 5 generally have a greater material thickness than the parting sheets 4 located within the heat exchanger blocks 10a and 10b. An aluminum alloy, for example aluminum alloys 3003 or 5083, is used as the material for the components mentioned of the heat exchanger blocks 10a and 10b.

For producing the heat exchanger blocks 10a and 10b, the solder-clad parting sheets 4, the fins 3, the distributor fins 2 and the side bars 8 are first stacked alternately one on top of the other. Then, the arrangement is brazed in a brazing furnace. Once the brazing has taken place, all of the components mentioned are fixedly connected to one another and consequently form compact cuboidal heat exchanger blocks 10a and 10b. The two beat exchanger blocks 10a and 10b are brazed separately from one another. They both have dimensions that represent maximum dimensions for a customary brazing furnace interior. If larger heat exchange surface areas than a heat exchanger block of the maximum possible brazing furnace size can provide are required for certain plants and processes, according to the present invention two or more heat exchanger blocks are connected to one another.

Figure 3:
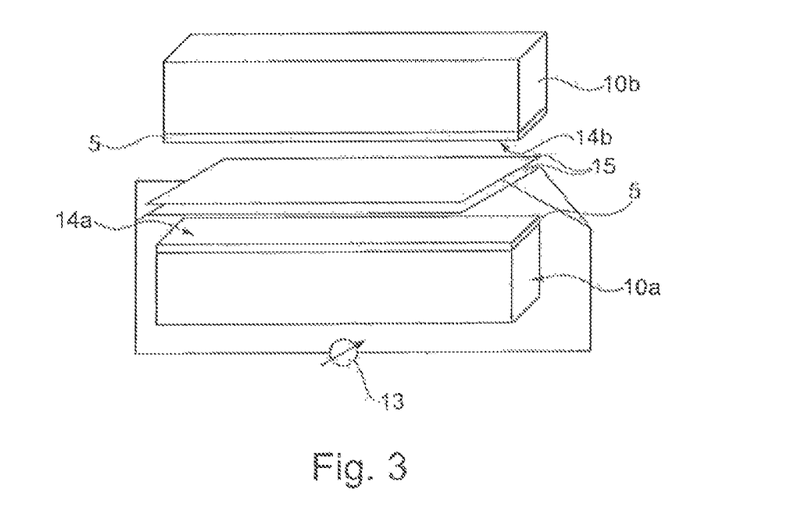
FIG. 3 shows a perspective view of two heat exchanger blocks that are connected to one another by way of two solder-clad sheets.

FIGS. 2 and 3 show alternative methods for connecting the heat exchanger blocks 10a and 10b. Reference is first made to FIG. 2.

According to FIG. 2, following the separate production of the heat exchanger blocks 10a and 10b that is described above, two flat wire arrangements 11 and 12 are arranged between cover sheets 5 of the heat exchanger blocks 10a and 10b to be connected. The first wire arrangement 11 has multiple solder-coated, first wire rods 111, which are arranged parallel to one another in a first plane and are connected in a parallel circuit with an electrical voltage source 13. The second wire arrangement 12 likewise has multiple second solder-coated wire rods 121, which are arranged parallel to one another in a second plane and are likewise connected in a parallel circuit with the voltage source 13. The wire rods 111 and 121 are coated with a solder that has a lower melting temperature than the solder with which the components of the heat exchanger blocks 10a and 10b are connected to one another. The wire rods preferably have a diameter in the range from approximately 0.2 mm to approximately 5 mm. The distances between the wire rods are preferably approximately 5 mm to approximately 50 mm.

An electrical voltage is respectively applied to the wire rods 111 and 121 by way of the voltage source 13, whereby a current flows through the wire rods 111 and 121. As a result of the resistance of the metal wires, this brings about a heating of the metal wires 111 and 121. The heated metal wires 111 and 121 bring about a melting of the applied solder. As soon as the metal wires 111 and 121 have reached the melting temperature of the solder, the connections to the voltage source 13 are interrupted, the wire arrangements 11 and 12, which were previously spatially at a distance from one another, are placed onto the lower heat exchanger block 10a and the upper heat exchanger block 10b is placed in line onto the lower heat exchanger block 10a. This is important for the subsequent attachment of common headers to the two heat exchanger blocks 10a and 10b. The wire arrangements 11 and 12 are thereby secured between the opposing outer surfaces 14a and 14b of the heat exchanger blocks 10a and 10b. After the solder has consequently cooled down and hardened, the two heat exchanger blocks 10a and 10b are connected in a material-bonded and frictional manner by way of the wire arrangements 11 and 12 and the hardened solder. The first wire rods 111 and the second wire rods 112 form with one another an included angle of approximately 90°, whereby a wire grid is formed.

The wire rods 111 and 112 protruding beyond the dimensions of the outer surfaces 14a and 14b are then cut off. With the aid of the connecting method presented, any number of heat exchanger blocks 10a and 10b can be connected to one another to form a heat exchanger block arrangement of any size, with an increased heat exchange surface area. The solder-attached metal wire rods 111 and 121 form together with the solder a heat bridge between the cover sheets 5 of the heat exchanger blocks 10a and 10b, whereby a thermally conducting contact is formed between the opposing cover sheets 5 of the heat exchanger blocks 10a and 10b. A heat-conducting contact extending over the extent of the surface area of the cover sheets is created between the heat exchanger blocks 10a and 10b by the thermally conducting connection. Temperature differences between the blocks 10a and 10b can consequently be eliminated, whereby temperature-induced stresses are reduced.

Moreover, the two heat exchanger blocks 10a and 10b are connected to one another in a material-bonded manner over the entire extent of the outer surfaces 14a and 14b, that is to say also in the center of the outer surfaces 14a and 14b, by the solder-attached metal wire grid, whereby the mechanical strength of the connection between the heat exchanger blocks is improved in comparison with a welded connection previously only present at the periphery.

Figure 4:
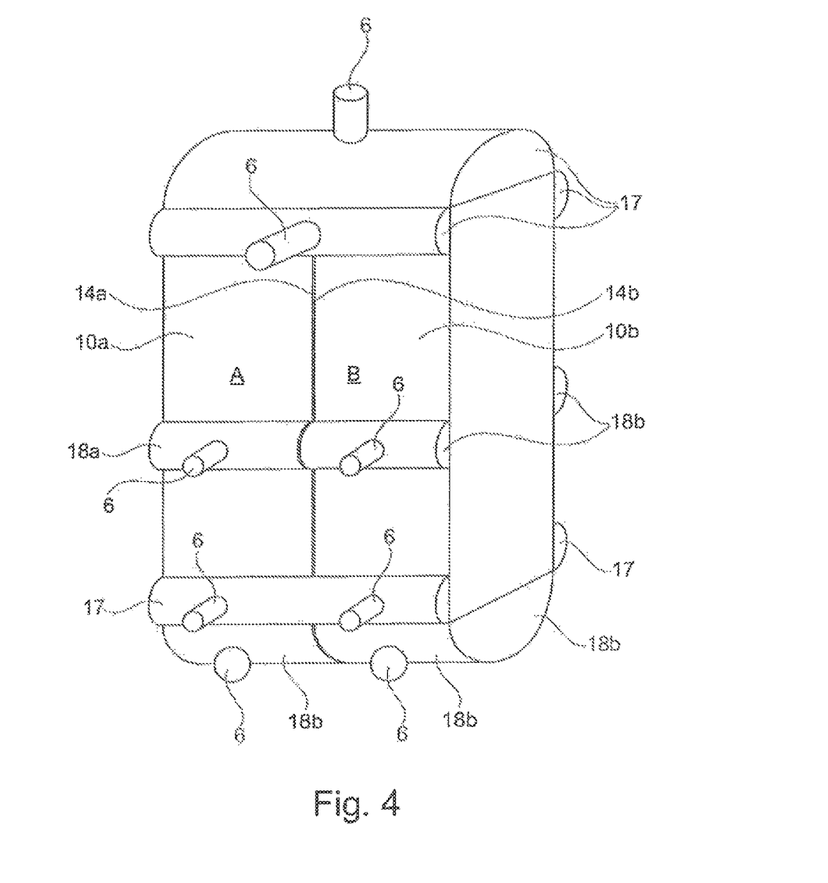
FIG. 4 shows a plate heat exchanger with the connected heat exchanger blocks in FIG. 2 or 3.

As represented in FIG. 4, after the connecting of the two heat exchanger blocks 10a and 10b, common headers 17, separate headers 18a and 18b with connector stubs 6 are attached to the heat exchanger blocks 10a and 10b by welding. They serve for distributing or collecting the fluids involved in the heat exchange. FIG. 4 shows a possible embodiment of a plate heat exchanger according to the invention.

As an alternative to the connecting method represented in FIG. 2, the heat exchanger blocks 10a and 10b may also be connected to one another by way of one or more, here two, solder-clad metal sheets 15. For this, metal sheets are clad on both sides with a solder layer over their full surface area. Solder-clad metal sheets in accordance with European standard EN-AW 3003 or EN-AW 5083, with an AlSi10Mg solder cladding, are used with particular preference as supports.

The solder-clad metal sheets 15 are first arranged spatially separate from one another and connected to a voltage source 13. The resistance that the metal sheets 15 form is used to heat them up. As soon as the solder-clad metal sheets 15 have reached the melting temperature of the solder, they are disconnected from the voltage source 13, placed onto the lower heat exchanger block 10a and the upper heat exchanger block 10b is placed on in line. The metal sheets 15 respectively have surfaces that correspond approximately to the outer surfaces 14a and 14b to be connected of the heat exchanger blocks 10a and 10b. If parts of the metal sheets 15 protrude beyond the outer surfaces 14a and 14b after the connecting of the heat exchanger blocks 10a and 10b, these parts are cut off after the solder has hardened completely.

The use of two solder-clad metal sheets 15 allows unevennesses on the outer surfaces 14a and 14b to be evened out better, since the three liquid solder layers between the two metal sheets 15 and the respective outer surfaces 14a and 14b of the heat exchanger blocks 10a and 10b can form different thicknesses during the joining together of the heat exchanger blocks 10a and 10b. As a departure from the embodiment represented, connections with a single metal sheet 15 are also possible. This may for example be provided with a multiple cladding, in order likewise to allow unevennesses on the outer surfaces 14a and 14b to be evened out well.

The solder-clad metal sheets 15 form a full-area, material-bonded connection between the cover sheets 5 of the heat exchanger blocks 10a and 10b, whereby an optimum thermally conducting contact is formed between the opposing cover sheets 5 of the heat exchanger blocks 10a and 10b. Moreover, the full-area connection results in a high mechanical strength.

As a departure from the embodiments represented in the figures, differently formed flat metal supports may also be used. The heating of the supports may also be performed by an induction means, such as an induction coil. It is generally also conceivable to heat the support by other heat sources, such as radiation heat, convection heat or the like. The aim is uniform heating of the support in order to achieve uniform, simultaneous melting of the solder over the entire extent of the support.

As represented in FIG. 4, after the connecting of the two heat exchanger blocks 10a and 10b, common headers 17, separate headers 18a and 18b with connector stubs 6 are attached to the heat exchanger blocks 10a and 10b by welding. They serve for distributing or collecting the fluids involved in the heat exchange.

| List of designations | |
|---|---|
| Heat exchange passage | 1 |
| Distributer fin | 2 |
| Fin | 3 |
| Parting sheet | 4 |
| Cover sheet | 5 |
| Connector stub | 6 |

-continued

| List of designations | |
|---|---|
| Collector, header | 7 |
| Side bar | 8 |
| Inlet or outlet port | 9 |
| Heat exchanger block | 10, 10a, 10b |
| First wire arrangement | 11 |
| First wire rods | 111 |
| Second wire arrangement | 12 |
| Second wire rods | 121 |
| Voltage source | 13 |
| Outer surface | 14a, 14b |
| Solder-clad metal sheet | 15 |
| Common header | 17 |
| Separate header | 18a, 18b |

The invention claimed is:

1. A method for producing a plate heat exchanger with at least two heat exchanger blocks, which are produced separately from one another in a brazing furnace, and each heat exchanger block has multiple parting sheets, arranged parallel to one another and form a multiplicity of heat exchange passages for fluids involved in the heat exchange, said method comprising:
after separately producing said at least two the heat exchanger blocks in the brazing furnace, heating at least one support provided with solder to melt the solder, wherein said at least one support is arranged between opposing outer surfaces of heat exchanger blocks to be connected,
wherein said solder has a lower melting point than solder used for connecting components within the heat exchanger blocks, and
placing the heat exchanger blocks to be connected one on top of one another or against one another in such a way that said at least one support is secured between the opposing outer surfaces.

2. The method as claimed in claim 1, wherein said at least one support is produced with metal.

3. The method as claimed in claim 1, wherein said at least one support is a metal sheet.

4. The method as claimed in claim 1, wherein said at least one support is constructed from an arrangement of metal wires.

5. The method as claimed in claim 1, wherein said at least one support has an area extent that corresponds at least to the outer surfaces to be connected of the heat exchanger blocks.

6. The method as claimed in claim 1, wherein said at least one support has a surface area that corresponds to a partial area of the outer surfaces of the heat exchanger blocks.

7. The method as claimed in claim 1, wherein said at least one support is provided with solder on one side or both sides.

8. The method as claimed in claim 6, wherein multiple supports in the form of strips are provided and are arranged next to one another.

9. The method as claimed in claim 1, wherein a solder layer is loosely placed or adhesively attached onto the at least one support or the at least one support is coated with the solder.

10. The method as claimed in claim 1, wherein the heat exchanger block are placed on top of one another or against one another when said at least one support has reached the melting temperature of the solder.

11. The method as claimed in claim 1, wherein said at least one support is heated by applying an electrical voltage or by an induction means.

12. The method as claimed in claim 1, wherein at least one first support, having multiple first solder-coated wire rods arranged parallel to one another in a first plane, and at least one second support, having multiple second solder-coated wire rods arranged parallel to one another in a second plane, are used, the first support and the second support being arranged in relation to one another in such a way that the first plane and the second plane are arranged parallel to one another and the first wire rods and the second wire rods are arranged at an angle to one another, the first wire rods and second wire rods.

13. The method as claimed in claim 12, wherein the first wire rods and the second wire rods are arranged at an angle to one another of approximately 90°.

14. The method as claimed in claim 1, wherein said at least one support is constructed in the form a wire grid.

15. The method as claimed in claim 1, wherein said opposing surfaces are rectangular in shape, said at least one support is flat and rectangular in shape, and said at least one support is arranged between said opposing outer surfaces and parallel thereto.

16. The method as claimed in claim 1, wherein said at least one support provided with solder extends to the center of said opposing outer surfaces of the heat exchanger blocks.

* * * * *